Figure 1:
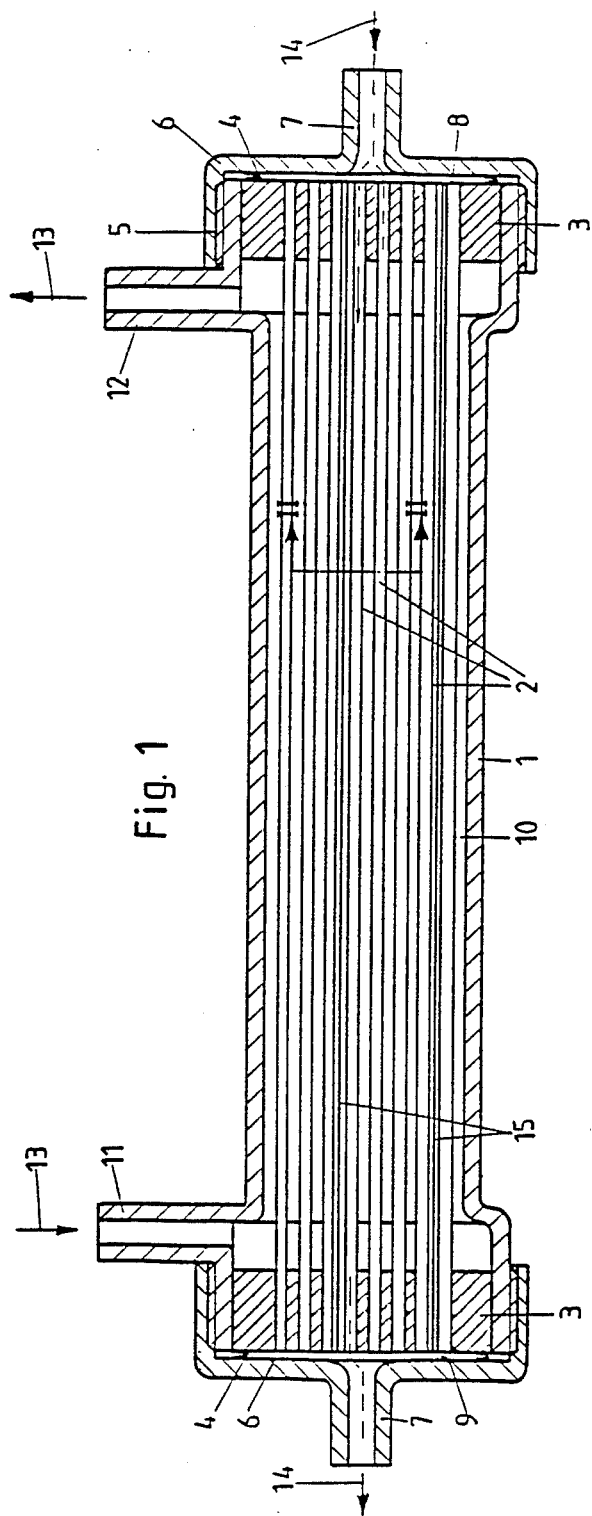

United States Patent [19]

Weickhardt

[11] Patent Number: 4,950,391
[45] Date of Patent: Aug. 21, 1990

[54] CAPILLARY DIALYZER

[75] Inventor: Ludwig Weickhardt, Bovenden, Fed. Rep. of Germany

[73] Assignee: Secon GmbH, Dransfield, Fed. Rep. of Germany

[21] Appl. No.: 311,099

[22] Filed: Feb. 15, 1989

[30] Foreign Application Priority Data

Feb. 22, 1988 [DE] Fed. Rep. of Germany ....... 3805414

[51] Int. Cl.$^5$ ...................... B01D 61/28; B01D 63/02
[52] U.S. Cl. ............................. 210/321.8; 210/321.89; 422/44
[58] Field of Search ...................... 210/321.78, 321.79, 210/321.8, 321.81, 321.87, 321.88, 321.89, 321.9; 55/158

[56] References Cited

U.S. PATENT DOCUMENTS

| 3,893,926 | 7/1975 | Awad | 210/321.79 |
| 4,293,418 | 10/1981 | Fujii et al. | 210/321.81 |
| 4,428,403 | 1/1984 | Lee et al. | 422/46 |

Primary Examiner—W. Gary Jones

[57] ABSTRACT

The Capillary Dialyzer contains a housing (1) with a bundle of capillaries (2) contained within. There are between the capillaries threads (15) of a textured yarn assigned to the bundle of capillaries without connection to the individual capillaries. In the bundle of capillaries (2) is such a number of threads (15) which are distribued evenly over the cross section of the bundle so that the cross section of the dialyzate chamber is filled with the threads in a resilient and elastic way.

7 Claims, 2 Drawing Sheets

CAPILLARY DIALYZER

This invention proceeds from a capillary dialyzer with a housing that is usually tubular and a bundle of capillaries in it fastened at both ends and sealed from one another and from the housing by an embedding composition to which are connected an inflow chamber and an outflow chamber for the blood, while the dialyzate in the dialyzate chamber is flowing around the capillaries in which are placed threads or textured yarn. Such capillary dialyzers are used mainly for hemodialysis.

The capillaries vary in diameter form their production, and thus produce different bundle diameters when they are bundled and inserted into a housing. On the other hand, a different number of capillaries is also incorporated in the same housing from case to case to produce dialyzers with different capacity grades. As a rule, therefore, there is always a certain space of capillaries in the housing, that is sometimes larger and sometimes smaller, so that the capillaries can move laterally in it, may be pressed together at one side, and in any case they shift nonuniformly and thus do not fill the cross section homogeneously. Because of these irregularities, the flow of dialyzate around the capillaries also behaves differently over the cross section. There are then places where the dialyzate flows through rapidly as if short-circuited, while other portions are impacted only slightly or not at all.

In accordance with the U.S. Pat. No. 4,293,418, it has been attempted to solve this problem by winding or looping a thread around the individual capillaries or several capillaries together; the thread may be applied either in the form of a helical screw thread, or interwined and crossing over itself. The thread has the purpose of being equivalent to the spacer around the individual capillaries. In this case also, irregularities occur in the flow of dialyzate when the wound capillaries rest against one another, because the spacing thread in one case is supported directly against the wall of the capillary, and in another case against the spacing thread of the adjacent capillary. In addition, the spacing thread is effective only at successive intervals and not continuously over the length of the capillaries. Production is relatively costly because a corresponding mechanical process has to be carried out. However, the important drawback of spacing yarn is that the expansion of the capillaries that occurs when it is wet with dialyzate is prevented by its arrangement. When a textured yarn is used, this drawback is counteracted to a great extent. However, it is impossible to produce a fit with such spacing yarn by winding around the capillaries in such a way that different numbers of capillaries can be accomodated tidly in one and the same housing to produce different capacity grades.

Furthermore, it is already known how to sew the individual capillaries to one another at intervals so that ultimately a matted structure is formed that can then be rolled up. The sewing thread is perpendicular to the capillaries and thus also perpendicular to the direction of flow of dialyzate, and just like the known spacing thread, ultimately it always represents a hindrance to the flow of dialyzate. Air bubbles can become attached to these threads, which then remain in the dialyzer and increasingly impede further passage.

The fundamental drawback of the looping yarn, spacing yarn, or the like, and of the sewing yarn, on the other hand, is always the fact that the outside diameter of the capillaries with the yarn is increased by this yarn, so that ultimately fewer capillaries can be accomodated in the housing. The individual treatment of the capillaries with the spacing yarn or sewing yarn also always involves all of the capillaries that are placed in a housing. Such fitting is also complicated and expensive.

The basic purpose of this invention is to reach the possibility that different numbers of capillaries can be introduced into one and the same housing, depending on the capacity grade. These are nevertheless always distributed in an orderly and even fashion over the cross section so that the disadvantage of dialyzate flow which has been described does not occur.

According to this invention, this is realized by the fact that the threads are assigned parallel to the direction of extension of the capillaries and without any connection to the individual capillaries in the bundle of capillaries, and that in the bundle of capillaries such number of threads is distributed roughtly evenly over the cross section of the bundle that the cross section of the dialyzate chamber is filled by the bundle of capillaries with the threads in a resiliant and elastic way. The threads are no longer assigned to the individual capillaries but to the bundle of capillaries and, respectively, the part of the dialyzate chamber which is not filled with capillaries. Because of this fundamentally different objective compared to the state of the art, and since the threads as packing or filling threads have no direct connection to the individual capillaries, the number of threads relative to the number of capillaries can be varied and modified directly to produce dialyzers of different capacity grades in spite of the use of a uniform housing. The packing threads serve to fill up dead spaces in the dialyzate chamber and to increase selectively the local flow resistance. The cross section of the dialyzate chamber is thus to be filled up, and the individual capillaries are not to be reinforced or protected. The packing threads are definitely to have a certain flow resistance. Because of its design as textured yarn, it permits dialyzate to flow through. The threads are to exert no blocking action on the dialyzate, so that none of the surface activity of the capillaries is lost. Because of the resilience and elasticity of the threads and their extensively uniform distribution in the bundle, a secure and uniform distribution of capillaries in the dialyzate chamber occurs. Preferred flow channels with short-circuited effects are avoided. Short dialyzate paths are formed, which is necessary for good dialyzate capacity. The elasticity and resilience of the packing thread also compensates for manufacturing tolerances of the capillaries in production, for example in diameter, without the necessity of changing the number of capillaries or threads. Such packing threads can naturally be manufactured and assembled substantially more easily than the spacing yarn looped around the individual capillaries as in the state of the art. No complicated and troublesome winding machine is needed, since the packing threads can be run disturbed through the bundle of capillaries directly. Assigning the threads to the bundle and no longer to one or two capillaries produces any desired ratio of mixing between capillaries and threads, so that the various capacities of dialyzers can be manufactured by this simple method. It is astonishing and surprising to one skilled in the art that the bandwidth known heretofore in a capacity grade of a capillary dialyzer becomes smaller; the bandwidth of the lines is shifted toward the ideal capacity or optimal capacity.

This means that the capillary dialyzers of a capacity grade, with otherwise unchanged production, lie closer to one another, and the specified capacity grade is adhered to more reliably and within narrower limits than was possible in the past. Because of the smaller capacity variations in this respect, the safety in use is increased. The uniform distribution of threads in the capillary bundle has a beneficial effect even during the production of the dialyzer. Better centering of the bundle occurs during the centrifugal process in which the embedding composition is introduced, because of the more uniform, resilient and elastic distribution of the bundle in the dialyzate chamber. Finally, production waste is also reduced when a capillary dialyzer of a relatively low capacity, or with few capillaries, is manufactured. Precisely this production presented special problems in the past.

The invention is based on the knowledge that because of the physical dependence of the flow resistance and thus of the flow rate of the third power of the diameter of a flow channel, a flow path not filled up by the capillaries can be divided into a sufficiently large number of individual small flow paths. The relative flow rates that flow through a tube with a diameter of 10 mm on the one hand and through 100 tubes with a diameter of 1 mm are related to one another as the third power of the diameters of the tubes, or $D^3 : d^3$ or, like 1000 : 100 or 1:10.

Therefore, although the flow area is of equal size in the two cases considered, only 1/10 of the quantity that flows through one tube with a diameter of 100 mm flows through 100 mm smaller flow paths. This step of dividing a single large flow path, for example a short circuit in a dialyzer pursuant to the state of the art, into a corresponding number of smaller flow paths pursuant to this invention, specifically with the same open flow cross section, reduces the unused quantity of dialyzate flowing through the dialyzer by 90%. This results in a substantial increase of efficiency. This is also the reason why an increase of the capacity grades occurs with otherwise unchanged parameters.

The threads can have approximately the diameter of the capillaries, or can be somewhat smaller in diameter. Thus, threads with a different order of size are used than in the state of the art, where the ratio of diameter of the looping thread to the diameter of the capillary was about 1:10. The described diameter is the diameter of the thread in the uncompressed state. It should be understood that threads are more easily resilient than the capillaries, so that the compression in the bundle is absorbed essentially by the threads.

Depending on the capacity grade, one thread is provided in the bundle of capillaries for about 10 to 25 capillaries. This mixing ratio is completely optional and can be adapted to the applications.

A textured yarn can be used as the thread with a porosity such that its flow resistance to the dialyzate corresponds to the flow resistance of adjacent capillaries. It is therefore not attempted to block the flow with the thread, but here also, a uniform flow through the cross section around the capillaries by the dialyzate is intended. A multifilament can preferably be used as the thread, but also a crinkled monofilament can be used. A textured, open structure of the thread is important, which can be compressed on the one hand, but through which dialyzate can also flow, on the other.

The invention will be illustrated and described further with reference to an example of embodiment. The drawings show:

FIG. 1 a section through a capillary dialyzer, and

Figure 2:
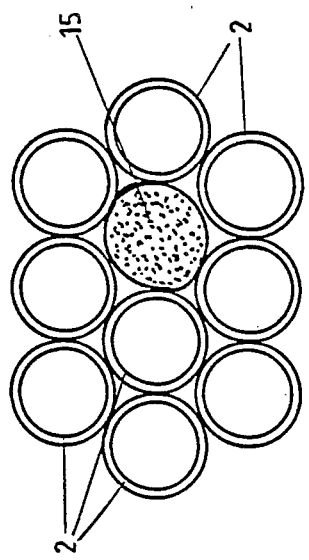
Figure 3:
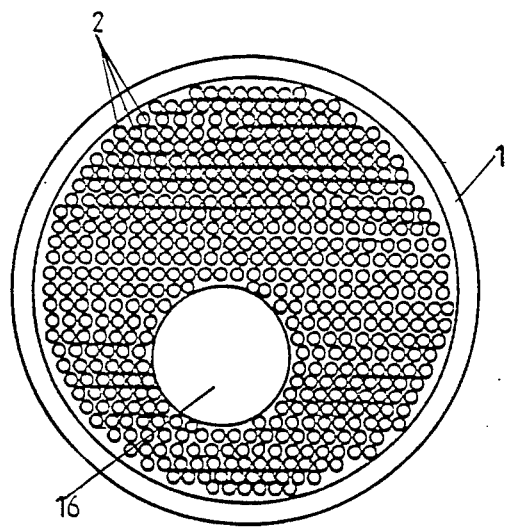
Figure 4:
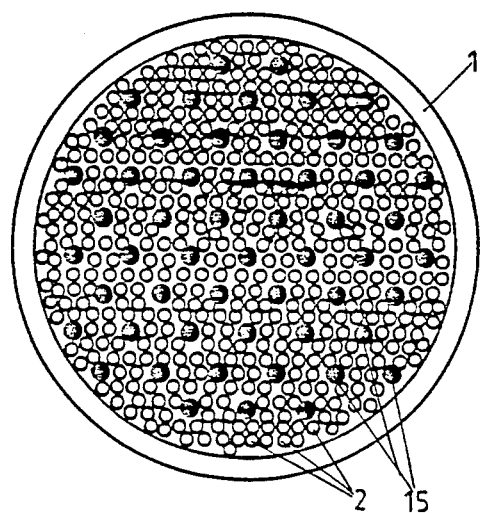

FIG. 2 a cutaway illustration of a section along the line II—II in FIG. 1,

FIG. 3 a diagrammatic section through a dialyzer pursuant to the state of the art, and FIG. 4 a diagrammatic section through the new dialyzer.

A capillary dialyzer shown in FIG. 1 has a housing 1 in the form of a section of tube, in which is located a bundle of many capillaries 2, which are shown in FIG. 1 greatly enlarged relatively, and in an unrealistically low number. The bundle of capillaries 2 is molded into an embedding composition 3 at both ends, which fastens the bundle of capillaries 2 not only in the housing 1, but seals off the capillaries 3 from one another and from the wall of the housing 1. The embedding composition 3 and the capillaries end in a faceplate 4. The ends of the tubular housing 1 are provided with an external thread 5, to which is screwed a cover 6 with an interposed gasket, not shown. The cover 6 has a connecting pipe 7 for the connection of a tubing line. At one end of the housing an inflow chamber 8 is formed in this way, and at the other end, an outflow chamber 9. The two chambers 8 and 9 are basically of the same or similar design, so that the capillary dialyzer can be used in one direction or the other. It should be understood that the blood enters the inflow chamber 8 through the connecting tube 7, is distributed there to the capillaries 2, and flows through them. The blood from the individual capillaries 2 is collected in the outflow chamber 9, and flows out through the connecting tube 7.

The internal space 10 present between the capillaries 2 between the embedding compositions 3 is intended for the dialyzate. The dialyzate flows in the direction of the arrows 13 through two tubes 11 and 12, while the blood moves in the direction of the arrows 14. Threads 15 of textured yarn are positioned between the capillaries 2 with largely uniform distribution over the cross section of the inner chamber 10. The threads 15 are not directly joined to the capillaries 2, but extend loosely in the direction of the capillaries 2. The threads 15 have a diameter that corresponds approximately to the outside diameter of an individual capillary 2. Threads 15 with a somewhat smaller diameter can also be used. It is important for these threads 15 to consist of textured, elastic, resilient material, or for example of a multifilament that also has the other requirements, for example compatibility with the dialyzate, etc. The threads 15 not only fill up the cross section of the inner space 10 when it is not filled by the capillaries 2. They support and hold the capillaries in place and thereby avoid the development of dead spaces, through which the dialyzate in the past could flow as in a short circuit. The dialyzate now is distributed more uniformly over the surface of the capillaries 2, so that surprisingly the bandwidth of capacities in a capacity grade is narrowed. This increases the safety in use. The ratio of mixing such threads 15 relative to the number of capillaries 2 can be chosen freely, so that different capacity grades are possible using a single size of housing. To mention such an example of use 250 threads can be provided for 6,000 capillaries.

FIG. 3 shows schematically a dialyzer pursuant to the state of the art in cross section. The capillaries 2 press tightly against one another in the housing 1, so that a single large flow cross section 16 remains open, or is produced, through which a large amount of dialyzate can flow in the manner of a short circuit, which is thus lost for the action of the dialyzer.

FIG. 4 shows diagrammatically the splitting up of this large flow cross section into a number of smaller, individual flow cross sections in the form of the inserted threads 15, which are distributed more or less uniformly over the open surface of the housing 1. The dependence of the flow resistance and thus of the flow rate on the third power of the diameter of the flow cross section 16 in comparison with the many small flow cross sections of the threads 15, as described above, applies here.

A sample calculation will illustrate this further:

1. Let us first consider a dialyzer with ideal distribution of capillaries 2. This dialyzer might have 2,000 capillaries 2 in its housing, so that 2,000 fine flow channels are formed between the capillaries 2. The effective diameter of the flow channels might be 0.3 mm. This results in a flow rate factor for this dialyzer with ideal distribution at a level of:

$$2{,}000 \times 0.3^3 = 54.$$

2. Let us imagine that in the dialyzer described under 1., the 2,000 capillaries are not arranged in ideal distribution over the cross section, but a larger flow cross section 16 (FIG. 3) with a diameter of 5 mm may have formed, and different flow conditions thus result. The diameter of the flow channels around the flow cross section 16 might be in ideal distribution. It is then reduced to a diameter of 0.278 mm. This results in a flow factor for the section of the dialyzer with the ideal distribution at a level of:

$$2{,}000 \times 0.278^3 = 43.$$

This corresponds to 36% of the amount of dialyzate, i.e., 36% of the dialyzate will flow through the section of the dialyzer in which the capillaries are provided in ideal distribution.

In addition to this, however, as assumed, there is a large, open flow cross section 16 with a diameter of 5 mm. The flow factor of this flow cross section 16 is found to be $$1 \times 5^3 = 75.$$

This corresponds to 64% of the amount of dialyzate, i.e., about ⅔ of the dialyzate flows through the open flow cross section 16 and thus deploys no activity, i.e., it is carried through the dialyzer without being used.

3. Let us now consider the object of the Application in comparison, in which a single free position of a flow cross section 16 with a diameter of 5 mm is divided into 100 flow paths with a diameter of 0.5 mm, which is equivalent to inserting 100 threads 15 with a diameter of 0.5 mm; the following then occurs. The flow factor 43 for the ideally distributed portion does not change. However, the flow factor for the flow path divided by the insertion of the threads 15 then amounts to $$100 \times 0.5^3 = 12.5.$$

This corresponds to an amount of dialyzate of 22.5%. It is thus found that the proportion of unused dialyzate is reduced from 64% to 22.5% by the insertion of 100 threads, or in other words, the amount of dialyzate is substantially better utilized.

This provides an indication of the observed increase of efficiency. However, not only is the efficiency increased, but the bandwidth of the capacity grades is reduced by the development pursuant to the invention. Two measured experiments may demonstrate this further:

(A) A dialyzer of conventional design, without inserted threads 15, was tested. It had 10,000 capillaries. The capillaries had an inside diameter of 0.2 mm. This dialyzer was supplied with a flow of blood of 200 ml/min and a flow of dialyzate of 500 ml/min. A capacity grade of 169.1 urea clearance ±16.48 was measured.

4% threads 15 were then added to the bundle of 10,000 capillaries with otherwise unchanged initial data. A capacity grade of 182.5 urea clearance ±7.8 was thus obtained. The capacity was therefore increased from 169.1 to 182.5, so that the shift to higher capacity is measurably demonstrated. At the same time, the tolerance of the capacity grade dropped from 16.48 to 7.8.

(B) A dialyzer with 8,700 capillaries with an inside diameter of 0.2 mm was tested, with 200 ml of blood/min and 500 ml of dialyzate/min being supplied to it in this case also. A capacity grade of 178.7 urea clearance ±4.8 was measured. In comparison with this, after 4% threads had been added to the capillaries, this dialyzer produced a capacity grade at the level of 182.3 urea clearance ±1.9.

I claim:

1. A hollow fiber dialyzer comprising
   a housing,
   embedding compositions in said housing defining a dialyzing chamber between said compositions and blood inflow and outflow chambers outside of said compositions between said compositions and said housing,
   hollow fibers that are fastened at both ends and sealed to said embedding compositions so that the interiors of said fibers communicate with said inflow and outflow chambers and the exteriors of said fibers are exposed in said dialyzing chamber, and
   spacing threads that are fastened at both ends in said embedding compositions, are parallel to each other and said fibers, are uniformly distributed in said dialyzing chamber, and are independent of individual hollow fibers.

2. The dialyzer of claim 1 wherein the threads have diameter that are the same size as or smaller than the diameters of the hollow fibers.

3. The dialyzer of claim 1 wherein there are between 10 and 25 said hollow fibers per thread.

4. The dialyzer of claim 1 wherein said threads are textured yarns.

5. The dialyzer of claim 4 wherein said textured yarns have porosity providing the same flow resistance as adjacent hollow fibers.

6. The dialyzer of claim 1 wherein said threads are multifilaments.

7. The dialyzer of claim 1 wherein said threads are crinkled monofilaments.

* * * * *

UNITED STATES PATENT OFFICE
CERTIFICATE OF CORRECTION

Patent No. 4,950,391  Dated August 21, 1990

Inventor(s) Ludwig Weickhardt

It is certified that error appears in the above-identified patent and that said Letters Patent is hereby corrected as shown below:

In the Abstract, line 6, "distribued" should be --distributed--;

Column 1, lines 35 to 36, "interwined" should be --intertwined--;

Column 2, line 20, "roughtly" should be --roughly--;

Column 2, line 59, "disturbed" should be --distributed--;

Column 4, line 64, after "use" insert --,--;

and

Column 6, line 51, "diameter" should be --diameters--.

Signed and Sealed this

Twenty-sixth Day of November, 1991

Attest:

HARRY F. MANBECK, JR.

*Attesting Officer*  *Commissioner of Patents and Trademarks*